(12) United States Patent
Wang et al.

(10) Patent No.: US 10,911,228 B2
(45) Date of Patent: Feb. 2, 2021

(54) ONE-DIMENSIONAL MODULATION CONTINUOUS-VARIABLE QUANTUM KEY DISTRIBUTION METHOD

(71) Applicant: Shanxi University, Taiyuan (CN)

(72) Inventors: Xuyang Wang, Taiyuan (CN); Yongmin Li, Taiyuan (CN)

(73) Assignee: Shanxi University, Taiyuan (CN)

( * ) Notice: Subject to any disclaimer, the term of this patent is extended or adjusted under 35 U.S.C. 154(b) by 423 days.

(21) Appl. No.: 15/904,977

(22) Filed: Feb. 26, 2018

(65) Prior Publication Data

US 2018/0294961 A1 Oct. 11, 2018

(30) Foreign Application Priority Data

Apr. 6, 2017 (CN) .......................... 2017 1 0230519

(51) Int. Cl.
*H04L 9/08* (2006.01)

(52) U.S. Cl.
CPC .................................. *H04L 9/0852* (2013.01)

(58) Field of Classification Search
CPC ..................................................... H04L 9/0852
See application file for complete search history.

(56) References Cited

U.S. PATENT DOCUMENTS

| | | | | |
|---|---|---|---|---|
| 2004/0109564 A1* | 6/2004 | Cerf | ....................... | H04L 9/0858 380/256 |
| 2006/0280509 A1* | 12/2006 | Tomaru | ................. | H04L 9/0858 398/188 |
| 2007/0009098 A1* | 1/2007 | Tanaka | .................. | H04L 9/0858 380/30 |
| 2015/0134947 A1* | 5/2015 | Varcoe | .................. | H04L 9/0858 713/150 |
| 2019/0199523 A1* | 6/2019 | Alleaume | ............. | H04L 9/0858 |
| 2020/0014533 A1* | 1/2020 | Fung | ..................... | H04L 9/0858 |

OTHER PUBLICATIONS

Vladyslav C Usenko and Frederic Grosshans, Unidimensional continous-variable quantum key distribution, Jan. 11, 2016, Palacky University, p. 1-7 (Year: 2016).*

* cited by examiner

*Primary Examiner* — Trang T Doan
*Assistant Examiner* — Jessica J South
(74) *Attorney, Agent, or Firm* — Wood Herron & Evans LLP (57) ABSTRACT

A one-dimensional modulation continuous-variable quantum key distribution method is provided. The method includes transmitting, at a transmit end, a signal light field that passes through a first amplitude modulator and a first signal adjustment apparatus, and a reference light field, to an optical fiber combiner, and to a receive end through a quantum transmission channel. The method also includes separating, at the receive end, a quantum signal after the quantum signal passes through a second signal adjustment apparatus and an optical fiber splitter; and transmitting a separated reference light field and a separated signal light field to a measurement apparatus after the separated reference light field passes through a third signal adjustment apparatus and a phase modulator. Signal amplitude modulation and phase locking can be implemented by an amplitude modulator and a phase modulator, thereby simplifying the structure of the apparatus and reducing production costs.

9 Claims, 7 Drawing Sheets

ONE-DIMENSIONAL MODULATION CONTINUOUS-VARIABLE QUANTUM KEY DISTRIBUTION METHOD

CROSS-REFERENCE TO RELATED APPLICATION

This application claims priority to Chinese Application No. 201710230519.2, filed Apr. 6, 2017. The above-mentioned patent application is incorporated herein by reference in its entirety.

TECHNICAL FIELD

The present invention relates to the field of quantum private communication technologies, and in particular, to a one-dimensional modulation continuous-variable quantum key distribution method.

BACKGROUND

Quantum key distribution is a manner of implementing quantum private communication. This communication mode prevents information from being eavesdropped by a third party during transmission. Its security features are based on the uncertainty principle and the quantum no-cloning theorem of quantum mechanics. Currently, quantum key distribution breaks down into continuous-variable quantum key distribution and discrete-variable quantum key distribution. Characterized by high compatibility with classic optical communication technologies, continuous-variable quantum key distribution is developing very rapidly in the past ten or more years by ongoing efforts made by scientific staff and has been commercialized by now.

In order to promote widespread use of quantum key distribution, simplification of related technologies is one of main trends currently. The simplification of the technologies can reduce system costs, reduce the size of an apparatus, reduce complexity and amount of data processing, and effectively enhance system practicality without compromising communication security.

In the continuous-variable field, related simplification schemes have now been put forward in theory, for example, a one-dimensional modulation solution, mainly including a two-state modulation scheme "Phys. Rev. A 79, 012307, 2009" that is a non-Gaussian modulation scheme, and a one-dimensional Gaussian modulation scheme "Phys. Rev. A 92, 062337, 2015" that is Gaussian modulation.

The one-dimension scheme simplifies a data modulation mode while ensuring system security. Generally, two-dimensional quantum key distribution implements X distribution that is the same as Y distribution (briefly known as symmetrical distribution), two modulators: an amplitude modulator (AM) and a phase modulator (PM) are required in a signal optical path at a transmit end, and one phase modulator is required in a reference optical path at a receive end.

In the continuous-variable quantum key distribution scheme, an existing principle experiment implemented one-dimensional Gaussian modulation distribution by using a single-phase modulator, as described in literature "Quant. Inf. Comput. 16, 1081-1095, 2016". However, in a more practical continuous-variable quantum key distribution experiment of a pulse light series, the one-dimensional Gaussian distribution described in the one-dimensional scheme cannot be implemented and a relative phase in a quantum-state transmission process cannot be locked according to the two-dimensional symmetrical modulation method if only one modulator exists at the transmit end, which is elaborated below.

Figure 3A:
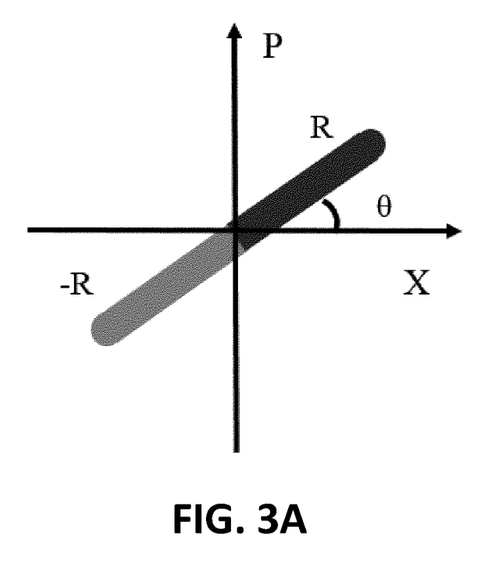
FIG. 3A shows a distribution of quadrature components in a phase space under one-dimensional Gaussian modulation, specifically when the phase is locked at $\theta$.
Figure 3B:
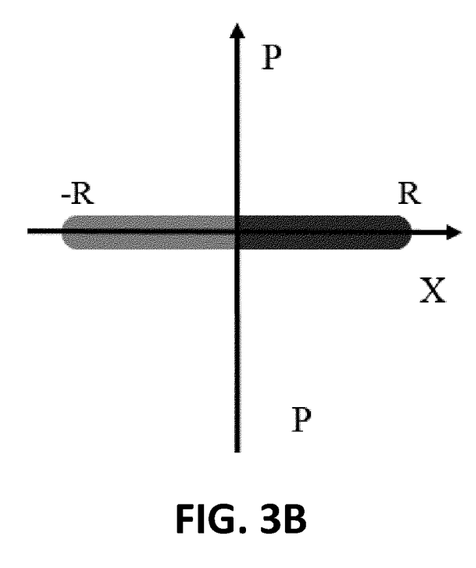
FIG. 3B shows a distribution of quadrature components in a phase space under one-dimensional Gaussian modulation, specifically when the phase is locked at θ=0.
Figure 3C:
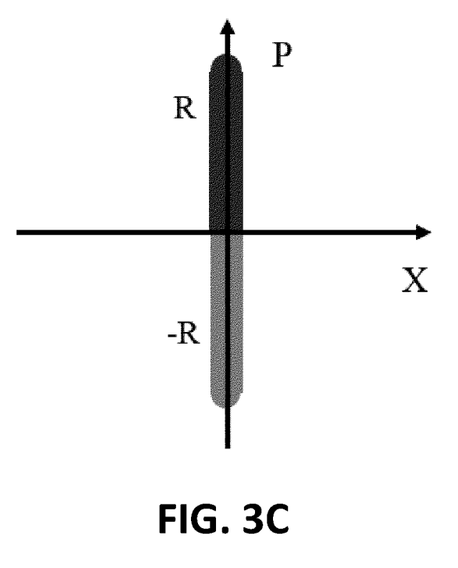
FIG. 3C shows a distribution of quadrature components in a phase space under one-dimensional Gaussian modulation, specifically when the phase is locked at θ=90.

In the two-dimensional modulation scheme, an amplitude modulator based on an MZ interference principle is used to implement radial $\chi 2$ (2) distribution of a quantum state of a light field in a phase space. One end point of the radial distribution is an origin in the phase space, and the other end point depends on a maximum intensity of the quantum state of the light field, as shown in an R line segment or an –R line segment in FIGS. 3A through 3C. The phase modulator is used to modulate a phase angle $\theta$. FIGS. 3A through 3C show distribution of quadrature components in a phase space under one-dimensional Gaussian modulation. FIG. 3A shows a scenario when the phase is locked at $\theta$; FIG. 3B shows a scenario of distribution on a quadrature amplitude after phase locking, corresponding to $\theta=0°$; and FIG. 3C shows a scenario of distribution on a quadrature phase after phase locking, corresponding to $\theta=90°$. To implement one-dimensional Gaussian distribution according to the foregoing modulation method, both an amplitude modulator and a phase modulator are required at the transmit end. A single-phase modulator cannot implement radial distribution of the quantum state of the light field. A single amplitude modulator cannot implement switching of the quantum state of the light field between R and –R, that is, cannot implement $\theta+0$ and $\theta+\pi$ phase modulation. The two devices need to work jointly to modulate a series of coherent states the one-dimensional Gaussian distribution state shown in FIGS. 3A through 3C.

Figure 5:
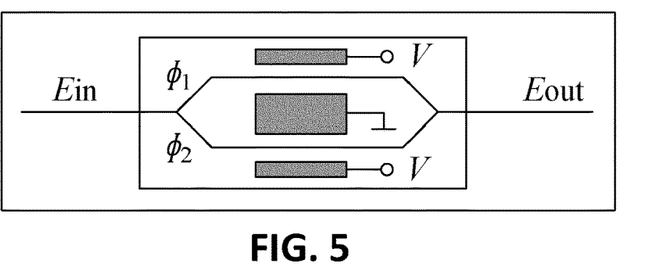
FIG. 5 is a schematic diagram of a first amplitude modulator.

To implement locking of the relative phase in the continuous-variable quantum key distribution of the pulse light series, a phase modulator needs to exist at each of the two ends, and some pulses need to be used for locking the relative phase. Generally, such pulses are called test pulses, and remaining pulses that are used to transmit information are called digital pulses. The amplitude modulator and the phase modulator at the transmit end are used to evenly modulate the test pulses used for phase locking to three states $\psi 1$, $\psi 2$, and $\psi 3$, respectively. As shown in FIG. 5, $\theta$ is a phase of the signal light field relative to the reference light field. A modulus of the amplitude of the three quantum states in the phase space is A, and a phase difference between every two of the three quantum states is $2\pi/3$. The receive end uses a quadrature amplitude value of the test pulses to calculate a current relative phase by formulas (1) and (2) below. To overcome impact of quantum noise and obtain a precise calculation result, the quadrature amplitude of each quantum state needs to be measured repeatedly and an average of quadrature amplitudes needs to be determined.

$$A = \sqrt{\frac{2}{3}(\bar{x}_1^2 + \bar{x}_2^2 + \bar{x}_3^2)}, \quad (1)$$

$$\bar{x}_i = \frac{1}{n}\sum_n (x_{i1} + x_{i2} + \ldots), i = 1, 2, 3$$

$$\sin(\theta) = \frac{1}{-\sqrt{3}A}(\bar{x}_3 - \bar{x}_2), \quad (2)$$

$$\cos(\theta) = \frac{1}{3A}(2\bar{x}_1 - \bar{x}_2 - \bar{x}_3)$$

After the relative phase is calculated, the current relative phase is locked by means of compensation. That is, a feedback voltage $V\varphi = V\pi \cdot \varphi/\pi$ ($\varphi=\theta-\delta$) is applied to the phase modulator of the reference optical path at the receive end, so that the phase of signal light is locked at δ. When δ=0, the relative phase is 0. When δ=π/2, the relative phase is π/2. For example, if the relative phase is locked at 0, a relationship between the calculated phase value and a feedback voltage value is:

$$V(k) = \frac{V_\pi}{\pi}\theta(k) = K_p\theta(k) \tag{3}$$

Compensation after analysis is a proportional term in a digital PID feedback algorithm, without an integral term or a differential term. Therefore, this term cannot eliminate a steady-state error in the locking.

Therefore, in a continuous-variable quantum key distribution experiment of a pulse light series, the one-dimensional Gaussian distribution of the quantum state of the light field in the phase space cannot be implemented by using a single modulator. The modulated voltage changes only in an interval $[-V\pi, 0]$ or $[0, V\pi]$. A change of the modulated voltage leads to change of only the amplitude of an output light field instead of the phase. That is, the quantum state of the light field can move in the only R or −R line segment in FIG. 4, the relative phase cannot be locked, and the steady-state error in the locked item cannot be eliminated.

SUMMARY

The present invention aims to provide a method for implementing one-dimensional modulation continuous-variable quantum key distribution. The method can simplify the structure of an apparatus and implement locking of a relative phase.

To achieve the preceding objective, the present invention provides the following solution.

In one embodiment, a method is provided for implementing one-dimensional modulation continuous-variable quantum key distribution, the method including:

generating a signal light field and a reference light field at a transmit end by using a pulse generation apparatus; transmitting the signal light field and the reference light field to an optical fiber combiner after the signal light field passes through a first amplitude modulator and a first signal adjustment apparatus; combining, by the optical fiber combiner, the signal light field and the reference light field into a quantum signal, and transmitting the quantum signal to a receive end through a quantum transmission channel; generating a first modulated voltage by using a first data processing apparatus, and loading the first modulated voltage onto the first amplitude modulator to adjust an amplitude and a phase of the signal light field;

separating the quantum signal at the receive end after the quantum signal passes through a second signal adjustment apparatus and an optical fiber splitter; transmitting a separated reference light field and a separated signal light field to a measurement apparatus after the separated reference light field passes through a third signal adjustment apparatus and a phase modulator; measuring a quadrature component of a quantum state of a pulse light field by using the measurement apparatus; and generating a feedback voltage, a second modulated voltage, and a measurement base voltage by using a second data processing apparatus, and loading the voltage onto the phase modulator, so as to lock a relative phase of the signal light field and the reference light field and randomly detect fluctuation of a quadrature component in another dimension under an effect of the feedback voltage or a joint effect of the second modulated voltage and the feedback voltage; and performing data processing on the measured quadrature component in the first data processing apparatus and the second data processing apparatus separately and obtaining a set of secure quantum keys at the transmit end and the receive end separately.

In some embodiments, the step of generating a first modulated voltage by a first data processing apparatus specifically includes generating 0 and 1 random codes by using a quantum random generator, and converting the random codes into random numbers that are evenly distributed in (0,1); generating a Gaussian distribution random number X according to the evenly distributed random numbers by using a Box-Muller method, where the Gaussian distribution random number X complies with a standard normal distribution N(0, 1), and a corresponding probability density function is:

$$f_X(X) = \frac{1}{\sqrt{2\pi}}e^{-\frac{X^2}{2}}, -\infty < X < +\infty; \tag{4}$$

and the following condition is met:

$$\int_{-\infty}^{+\infty} \frac{1}{\sqrt{2\pi}} e^{-\frac{X^2}{2}} dX = 1; \tag{5}$$

performing truncation at ±3σ, and converting formula (5) into:

$$\int_{-3}^{+3} \frac{1}{\sqrt{2\pi}\,\sigma} e^{-\frac{X^2}{2\sigma^2}} dX = 99.74\%, \sigma = 1; \tag{6}$$

with an interval of an amplitude transmittance r of the first amplitude modulator being $[-1,1]$, substituting Z=X/3 for X, so that Z corresponds to r in a one-to-one mapping manner, and then converting formula (6) into:

$$\int_{-1}^{+1} \frac{1}{\sqrt{2\pi}\,\sigma} e^{-\frac{Y^2}{2\sigma^2}} dZ = 99.74\%, \sigma = 1/3, \tag{7}$$

where Z denotes an intermediate variable; when the relative phase of the reference light field and the signal light field is 0, $$Z = \tag{8}$$
$$r = E_{out}/R = \cos(\alpha V + \Delta) = \cos\left(\frac{\pi}{2V_\pi}V + \Delta\right) = \cos\left(\frac{\pi}{2V_\pi}(V + V_{max})\right);$$

determining, according to formula (8), that the first modulated voltage loaded on the first amplitude modulator is V:

$$V = \frac{2V_\pi}{\pi}\arccos Z - V_{max}, \tag{9}$$

where $V_{max}$ denotes a maximum transmittance voltage.

In one aspect, the pulse generation apparatus includes a fiber laser, a pulse generator, two second amplitude modulators, and a first fiber coupler, where the two second amplitude modulators are cascaded between the fiber laser and a first polarization-maintaining fiber coupler, are both connected to the pulse generator, and are used to adjust, as driven by a pulse signal emitted by the pulse generator, an amplitude of each laser signal emitted by the fiber laser; and the first fiber coupler is used to perform beam splitting on the amplitude-adjusted laser signal to obtain the signal light field and the reference light field.

In another aspect, the first signal adjustment apparatus includes a first polarization-maintaining fiber and a variable optical attenuator, and the first amplitude modulator, the first polarization-maintaining fiber, the variable optical attenuator, and the optical fiber combiner are connected in sequence.

In a further aspect, the quantum transmission channel includes a first single-mode fiber or a transmission medium formed by a free space.

In yet another aspect, the step of generating a feedback voltage and a second modulated voltage by using a second data processing apparatus and loading the voltage onto the phase modulator specifically includes: loading the feedback voltage onto the phase modulator throughout an entire time segment measured by a phase value; and loading the second modulated voltage concurrently in a test pulse time segment in the entire time segment.

Alternatively, the feedback voltage $V_f(k)$ is determined according to the following formula:

$$V_f(k) = K_P \theta(k) + K_I \sum_{i=0}^{k} \theta(i) + K_D(\theta(k) - \theta(k-1)), \quad (10)$$

where i and k are used to mark a data block, $K_p$ denotes a scale factor, $K_I$ denotes an integral coefficient, $K_D$ denotes a differential coefficient, and $\theta$ denotes the relative phase, and a voltage calculated by using the $k^{th}$ data block in a process of locking the relative phase needs to be loaded onto the $(k+1)^{th}$ data block; the first modulated voltage is determined according to the following formula:

$$V_1 = V_f + V_{0\pi/3}, V_2 = V_f + V_{2\pi/3}, V_3 = V_f + V_{4\pi/3} \text{ or } V_3 = V_f + V_{-2\pi/3} \quad (11),$$

where $V_f$ denotes the feedback voltage, $V_{0\pi/3}$ denotes a phase voltage when a phase angle is 0, $V_1$ denotes a first modulated voltage corresponding to a 0 value of the phase angle, $V_{2\pi/3}$ denotes a phase voltage when the phase angle is $2\pi/3$, $V_2$ denotes a first modulated voltage corresponding to a $2\pi/3$ value of the phase angle, $V_{-2\pi/3}$ denotes a phase voltage when the phase angle is $-2\pi/3$, $V_{4\pi/3}$ denotes a phase voltage when the phase angle is $4\pi/3$, and $V_3$ denotes a first modulated voltage corresponding to a $-2\pi/3$ or $4\pi/3$ value of the phase angle; a formula for calculating a measurement base voltage $V_R$ in another dimension is:

$$V_R = \begin{cases} V_f & \text{random number is 0, not converted by measuring machine} \\ V_f - V_{\pi/2} & \text{random number is 1, converted by measuring machine} \end{cases} \quad (12)$$

where $V_{\pi/2}$ denotes a phase voltage when the phase angle is $\pi/2$.

In another embodiment, the second signal adjustment apparatus includes a single-mode fiber coupler, a first detector, a high-speed comparator, a delayer, a dynamic polarization controller, a second polarization-maintaining coupler, and a second detector, where the quantum transmission channel, the single-mode fiber coupler, the first detector, the high-speed comparator, the delayer, and the second data processing apparatus are connected in sequence, to implement clock recovery and synchronization; and the second polarization-maintaining coupler is disposed between the optical fiber splitter and the third signal adjustment apparatus, the second polarization-maintaining coupler, the second detector, and the second data processing apparatus are connected in sequence, and the dynamic polarization controller is connected to the single-mode fiber coupler, the second data processing apparatus, and the optical fiber splitter, to implement automatic control of light field polarization.

Alternatively, the measurement apparatus includes: a 50/50 polarization beam coupler, connected to the optical fiber splitter and the phase modulator, and configured to perform polarization and coupling on the signal light field and the reference light field; and a time domain pulse balanced homodyne detector, connected to the polarization beam coupler, and configured to measure a quadrature component of the signal light field.

In one aspect, the performing data processing on the measured quadrature component in the first data processing apparatus and the second data processing apparatus specifically includes: performing parameter analysis, data reconciliation and privacy amplification on the measured quadrature component.

According to specific embodiments provided, the present invention achieves the following technical effects. In the method for implementing one-dimensional modulation continuous-variable quantum key distribution in the present invention, a first amplitude modulator modulates an amplitude of a measured light field under an effect of a first modulated voltage to obtain a modulated measured light field distributed in one-dimensional quadrature components in a phase space, where the distribution may be two-state distribution or Gaussian distribution. Signal modulation and phase locking can be implemented by an amplitude modulator and a phase modulator, thereby simplifying the structure of the apparatus and reducing production costs.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings. The accompanying drawings, which are incorporated in and constitute a part of this specification, illustrate one or more embodiments of the invention and, together with the general description given above and the detailed description given below, explain the one or more embodiments of the invention.

DETAILED DESCRIPTION

The following description clearly and completely describes the technical solutions in the embodiments of the present invention with reference to the accompanying drawings in the embodiments of the present invention. The described embodiments are merely a part rather than all the embodiments of the present invention. All other embodiments obtained by a person of ordinary skill in the art based on the embodiments of the present invention without creative efforts shall fall within the protection scope of the present invention.

The embodiments of the present invention provide several technical effects and advantages over convention designs. To this end the present invention aims to provide a one-dimensional modulation continuous-variable quantum key distribution method. A first amplitude modulator modulates an amplitude of a measured light field under an effect of a first modulated voltage to obtain a modulated measured light field distributed in one-dimensional quadrature components in a phase space, where the distribution may be two-state distribution or Gaussian distribution. Signal modulation and phase locking can be implemented by an amplitude modulator and a phase modulator, thereby simplifying the structure of the apparatus and reducing production costs.

Figure 1:
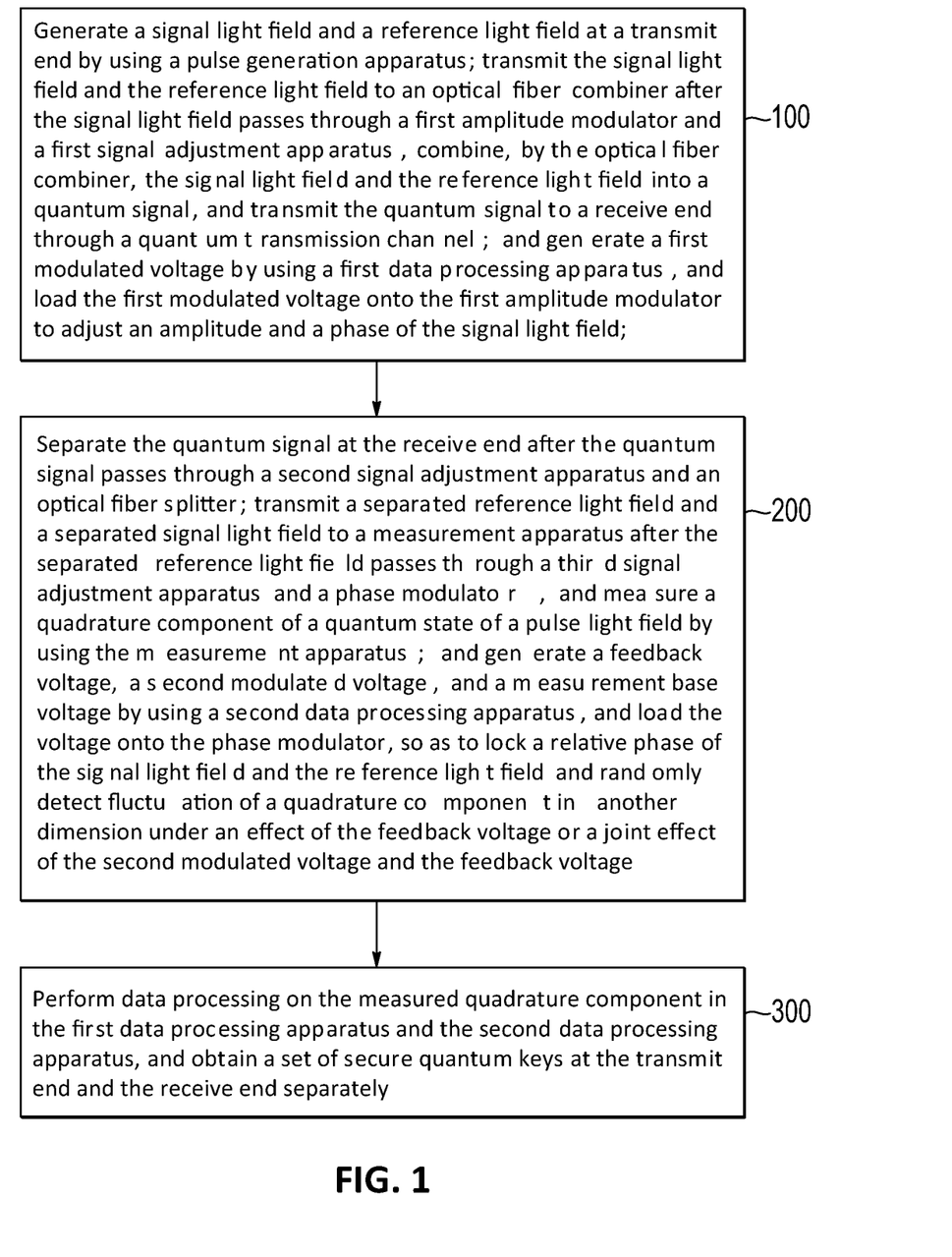
FIG. 1 is a flowchart of a method for implementing one-dimensional modulation continuous-variable quantum key distribution according to one embodiment of the present invention.
Figure 2:
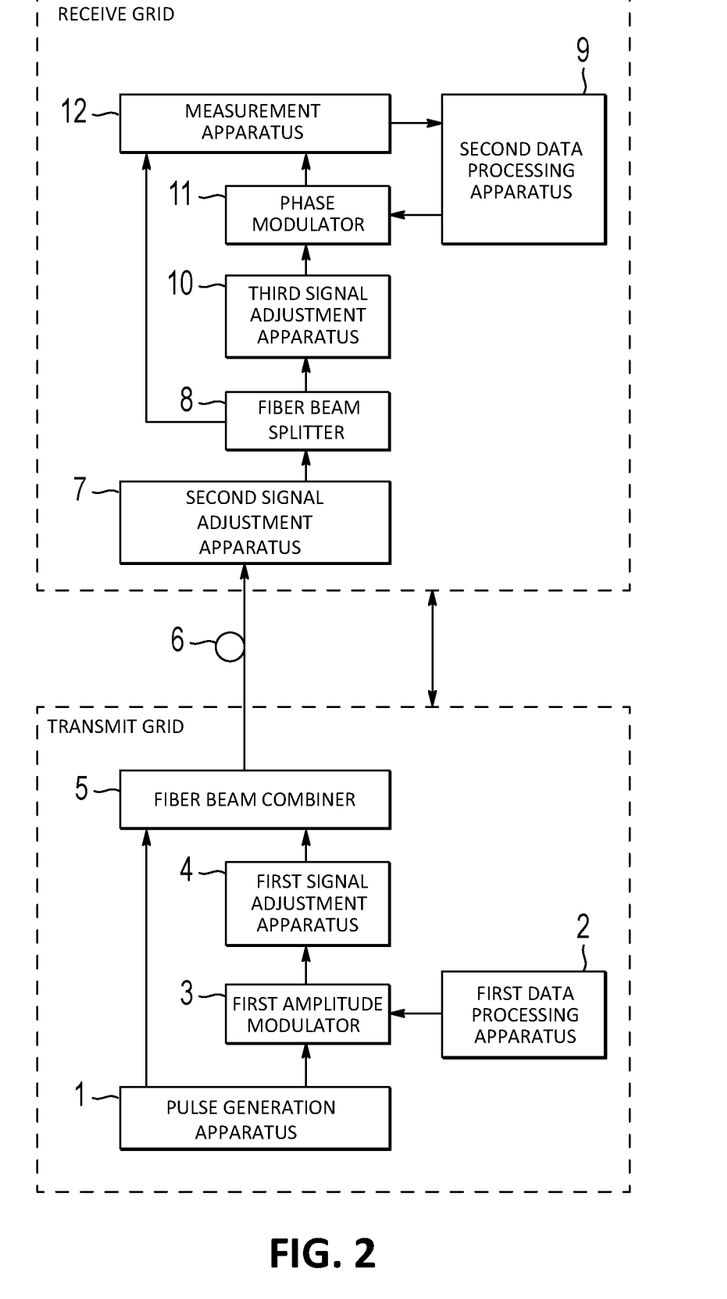
FIG. 2 is a schematic diagram of a module structure corresponding to the method of FIG. 1.

As shown in FIGS. 1 and 2, the method for implementing one-dimensional modulation continuous-variable quantum key distribution, in accordance with one embodiment of the invention, includes the following steps.

Step 100: Generate a signal light field and a reference light field at a transmit end by using a pulse generation apparatus 1; transmit the signal light field and the reference light field to an optical fiber combiner 5 after the signal light field passes through a first amplitude modulator 3 and a first signal adjustment apparatus 4, combine, by the optical fiber combiner 5, the signal light field and the reference light field into a quantum signal; transmit the quantum signal to a receive end through a quantum transmission channel 6; and generate a first modulated voltage by using a first data processing apparatus 2, and load the first modulated voltage onto the first amplitude modulator 3 to adjust an amplitude and a phase of the signal light field.

Step 200: Separate the quantum signal at the receive end after the quantum signal passes through a second signal adjustment apparatus 7 and an optical fiber splitter 8; transmit a separated reference light field and a separated signal light field to a measurement apparatus 12 after the separated reference light field passes through a third signal adjustment apparatus 10 and a phase modulator 11; measure a quadrature component of a quantum state of a pulse light field by using the measurement apparatus 12; and generate a feedback voltage, a second modulated voltage, and a measurement base voltage by using a second data processing apparatus 9, and load the voltage onto the phase modulator 11, so as to lock a relative phase of the signal light field and the reference light field and randomly detect fluctuation of a quadrature component in another dimension under an effect of the feedback voltage or a joint effect of the second modulated voltage and the feedback voltage.

Step 300: Perform data processing on the measured quadrature component in the first data processing apparatus 2 and the second data processing apparatus 9 separately and obtain a set of secure quantum keys at the transmit end and the receive end separately.

Figure 8:
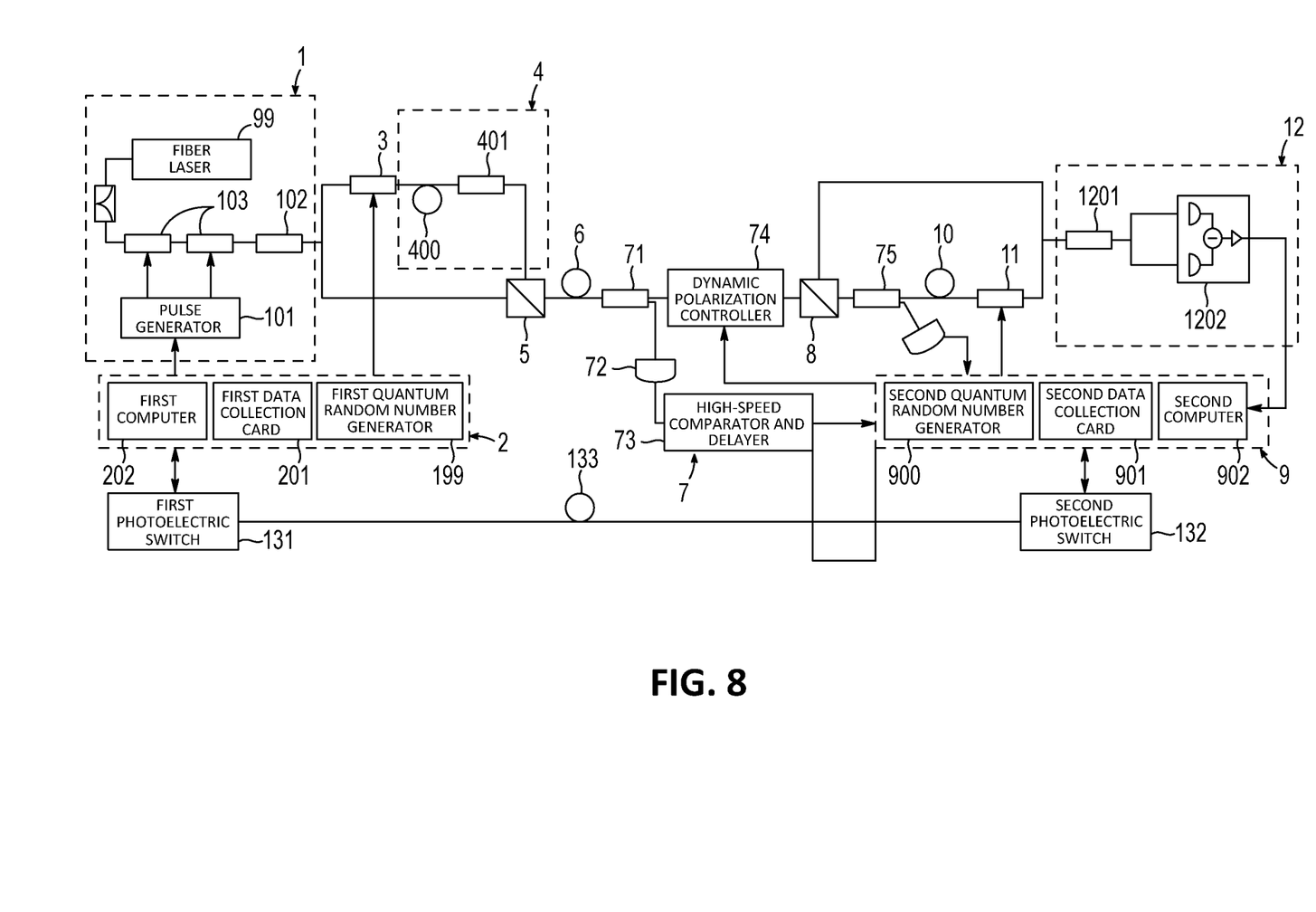
FIG. 8 is a schematic diagram of a specific structure used with the module structure of FIG. 2.

As shown in FIG. 8, which shows more detailed structure of the module shown in FIG. 2 for performing the method of FIG. 1, the pulse generation apparatus 1 includes a fiber laser 99, a pulse generator 101, two second amplitude modulators 103, and a first fiber coupler 102. The two second amplitude modulators 103 are cascaded between the fiber laser 99 and a first fiber coupler 102, are both connected to the pulse generator 101, and are used to adjust, as driven by a pulse signal emitted by the pulse generator 101, an amplitude of each laser signal emitted by the fiber laser 99. The first fiber coupler 102 is used to perform beam splitting on the amplitude-adjusted laser signal to obtain the signal light field and the reference light field.

Preferably, the pulse generation apparatus 1 further includes a filter. The filter is disposed between the fiber laser 99 and the second amplitude modulator 103. In this embodiment, the fiber laser 99 is a 1550 nm fiber laser. In this embodiment, the first fiber coupler 102 is a polarization-maintaining fiber coupler and is specifically a 10/90 polarization-maintaining fiber coupler. The first fiber coupler 102 may also be replaced with an optical fiber splitter.

Two electric pulse signals generated by the pulse generator 101 have high driving capabilities and can directly drive the second amplitude modulator 103. Both electric pulse signals can adjust a pulse width and a delay independently at an adjustment precision of up to 1 ns. The two electric pulse signals output by the pulse generator 101 are attached to radio frequency input ports of two cascaded second amplitude modulators 103 and can modulate a continuous light field into a high-extinction-ratio pulse light field with a pulse width of 100 ns, a repetition rate of 500 kHz, and an extinction ratio of 80 dB. The pulse light field is split into a measured light signal and a reference light signal after passing through a 10/90 optical fiber splitter.

The first data processing apparatus 2 includes a first quantum random number generator 199, a first data collection card 201, a first analog voltage generator (not shown in the figure), and a computer 202. The first quantum random number generator 199 is used to generate a quantum random number required for one-dimension modulation. The first data collection card 201 is connected to the pulse generator 101 and is configured to provide a first clock signal. The first analog voltage generator is connected to the first amplitude modulator 3 and is configured to output a first modulated voltage. The first computer 202 is connected to the first data collection card 201 and the first analog voltage generator and is configured to determine the first modulated voltage according to the quantum random number and control the analog voltage generator to output a corresponding first modulated voltage according to the first clock signal and load the first modulated voltage onto the first amplitude modulator 3.

During running, the pulse generator 101 uses the clock signal provided by the first data collection card 201 to ensure consistency of clock signals before the clock signals pass through the optical fiber combiner 5.

The method for implementing one-dimensional modulation continuous-variable quantum key distribution in the present invention mainly uses amplitude modulation characteristics and phase jump characteristics of the first amplitude modulator 3. The amplitude modulation characteristics can implement radial distribution of a quantum state in a phase space (as shown in FIGS. 3A through 3C), that is, movement on R or −R. The phase jump can implement θ+0 and θ+π (denotes the relative phase of the measured light signal and the reference light signal) modulation of the phase, that is, implement switching between R and −R. The principles are shown in FIG. 5. A light field with an amplitude of $E_{in}=A \cdot e^{i\phi}$ is equally divided into two parts after entering the first amplitude modulator 3. A change amount of the phase is φ1 and φ2 respectively. Upon outputting light, two beams are combined into one, and the output amplitude $E_{out}$ is shown in formula 13.

$$E_{out} = \frac{E_{in}}{2}(e^{i\phi_1} + e^{i\phi_2}) = E_{in}\cos\frac{\phi_1 - \phi_2}{2}e^{i\frac{\phi_1+\phi_2}{2}}. \quad (13)$$

Because voltages loaded onto the two optical paths have reverse polarities, the change amount of the phase is:

$$\phi_1 = \alpha V + \Delta_1, \phi_2 = -\alpha V + \Delta_2 \quad (14),$$

where α and V are voltage-dependent, and a is a constant. $\Delta_1$, $\Delta_2$ are inherent phase shift, that is, varying with the amplitude modulator and voltage-independent. Therefore, the amplitude $E_{out}$ and the intensity $I_{out}$ of a light signal output by the first amplitude modulator 3 may be obtained by means of conversion:

$$E_{out} = E_{in}\cos(\alpha V + \Delta_1 - \Delta_2)e^{i\frac{\Delta_1+\Delta_2}{2}} = Ae^{i\phi}\cos(\alpha V + \Delta_1 - \Delta_2)e^{i\frac{\Delta_1+\Delta_2}{2}} \quad (15)$$

$$= A\cos(\alpha V + \Delta_1 - \Delta_2)e^{i\left(\frac{\Delta_1+\Delta_2}{2}+\phi\right)} = A\cos(\alpha V + \Delta)e^{i\theta};$$

$$I_{out} = \quad (16)$$
$$E_{out}E_{out}^* = |E_{out}|^2 = |E_{in}|^2\cos^2(\alpha V + \Delta) = A^2\frac{1 + \cos(2\alpha V + 2\Delta)}{2}.$$

Figure 6:
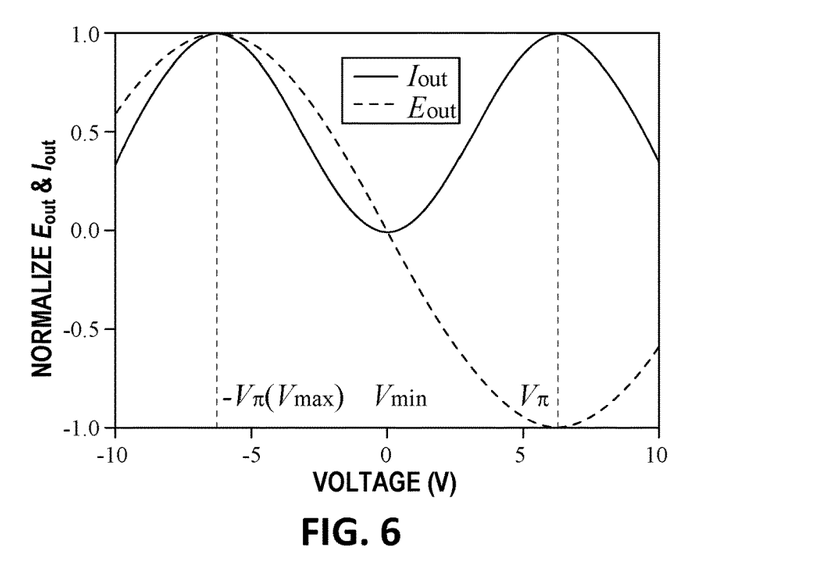
FIG. 6 is a line graph showing variations of an amplitude $E_{out}$ and an intensity $I_{out}$ of an output light field of a first amplitude modulator based on voltage.

Using the modulus of the amplitude of the input light signal as a normalization unit, that is, assuming A=1, expressions of $E_{out}$ and $I_{out}$ are rendered into a schematic diagram shown in FIG. 6, in which an initialized phase is Δ=απ/2, and the value of α is 0.25. From the diagram, an amplitude period of the light signal output by the first amplitude modulator is double of an intensity period. Using intensity change as a period, a half-wave voltage of the intensity change is denoted by $V_\pi$, and a half-wave voltage of the amplitude change is $2V_\pi$. From the diagram, the phase of the amplitude value jumps at a minimum value of an intensity change curve. The method for implementing one-dimensional modulation continuous-variable quantum key distribution in the present invention can cause the voltage to fluctuate within $[-V_\pi, V_\pi]$, to implement the quantum state of the light field, that is, implement movement in both the R line segment and the −R line segment. That is, because the phase can change from θ+0 to θ+π when the voltage changes from $[-V_\pi, 0]$ to $[0, V_\pi]$. That is, the first amplitude modulator 3 implements phase modulation of θ+0 and θ+π.

The step of generating a first modulated voltage by a first data processing apparatus specifically includes using the first quantum random number generator to generate random codes 0 and 1, converting the random codes into random numbers that are evenly distributed on (0,1). Then generating a Gaussian distribution random number X by using a Box-Muller method, where the Gaussian distribution random number X complies with a standard normal distribution N(0, 1), and a corresponding probability density function is:

$$f_X(X) = \frac{1}{\sqrt{2\pi}}e^{-\frac{X^2}{2}}, -\infty < X < +\infty; \quad (4)$$

and the following condition is met:

$$\int_{-\infty}^{+\infty}\frac{1}{\sqrt{2\pi}}e^{-\frac{X^2}{2}}dX = 1. \quad (5)$$

The generated data of the first modulated voltage needs to be output by a first analog voltage generator. Because an output voltage of an analog voltage generation device in practical application has bounds, a Gaussian number needs to be truncated. In order to obtain a high precision, truncation is generally performed at ±3σ or ±4σ. If truncation is performed at ±3σ, formula (5) may be converted into:

$$\int_{-3}^{+3}\frac{1}{\sqrt{2\pi}\sigma}e^{-\frac{X^2}{2\sigma^2}}dX = 99.74\%, \sigma = 1. \quad (6)$$

Because an interval of an amplitude transmittance r of the first amplitude modulator 3 is [−1,1], to facilitate data processing, Z=X/3 is substituted for X, so that Z corresponds to r in a one-to-one mapping manner, and then formula (6) is converted into:

$$\int_{-1}^{+1}\frac{1}{\sqrt{2\pi}\sigma}e^{-\frac{Y^2}{2\sigma^2}}dZ = 99.74\%, \sigma = 1/3, \quad (7)$$

where Z denotes an intermediate variable.

In the expression of $E_{out}$ in formula (15), $e^{i\theta}$ is a phase term of the measured light signal relative to the reference light signal and is voltage-dependent. After the relative phase is locked to the 0 phase, this phase term is removable, and quantum states of the modulated light field are distributed on quadrature amplitude components. After the relative phase is locked to the π/2 phase, this phase term is removable, and quantum states of the modulated light field are distributed on quadrature phase components. Without compromising generality, when the relative phase is 0, the following may be defined:

$$Z = r \quad (8)$$
$$= E_{out}/R$$

-continued $$= \cos(\alpha V + \Delta)$$

$$= \cos\left(\frac{\pi}{2V_\pi} V + \Delta\right)$$

$$= \cos\left(\frac{\pi}{2V_\pi}(V + V_{max})\right).$$

According to the foregoing formula (8), the first modulated voltage V loaded on the first amplitude modulator 3 by the first analog voltage generator under control of the first computer is:

$$V = \frac{2V_\pi}{\pi} \arccos Z - V_{max}, \qquad (9)$$

where $V_{max}$ denotes a maximum transmittance voltage.

According to the foregoing method, a one-dimensional Gaussian modulation can be performed on the quantum light field by modulating the quadrature amplitude or modulating the quadrature phase. The one-dimensional two-state modulation scheme is relatively simple, and two first modulated voltage values can be calculated by substituting ±|r| into the foregoing formula.

As shown in FIG. 8, the first signal adjustment apparatus 4 includes a first polarization-maintaining fiber 400 and a variable optical attenuator 401. The first amplitude modulator 3, the first polarization-maintaining fiber 400, the variable optical attenuator 401, and the optical fiber combiner 5 are connected in sequence. In this embodiment, the first polarization-maintaining fiber 400 is an 80 m polarization-maintaining fiber. The quantum transmission channel 6 may be a first single-mode fiber or a light transmission medium formed by a free space.

The second data processing apparatus 9 includes a second quantum random generator 900, a second data collection card 901, a second analog voltage generator (not shown in the figure), and a second computer 902. The second data collection card 901 is configured to provide a second clock signal. The second analog voltage generator is connected to the phase modulator 11 and is configured to generate a feedback voltage or generate both a feedback voltage and a second modulated voltage, and load the voltage onto the phase modulator 11, and generate a measurement base voltage that is used to randomly detect fluctuation of the quadrature component in another dimension. The second computer 902 is connected to the second data collection card 901 and the second analog voltage generator and is configured to control, according to the second clock signal, the second analog voltage generator generate a feedback voltage or generate both a feedback voltage and a second modulated voltage and load the voltage onto the phase modulator 11.

The step of generating a feedback voltage and a second modulated voltage by using a second data processing apparatus 9 and loading the voltage onto the phase modulator 11 specifically include: continuing the loading of the feedback voltage onto the corresponding modulator in an entire time segment of measuring a phase value, during which the feedback voltage is approximately a direct current voltage; loading the second modulated voltage in a test pulse time segment rather than a data pulse time segment, where the second modulated voltage is an alternate current voltage; and loading, on both ends of the phase modulator 11, a voltage obtained by adding the feedback voltage and the second modulated voltage, so as to implement modulation of the test pulse, accurately measure the current relative phase, and ensure stable transmission of data with the phase being locked.

Figure 4:
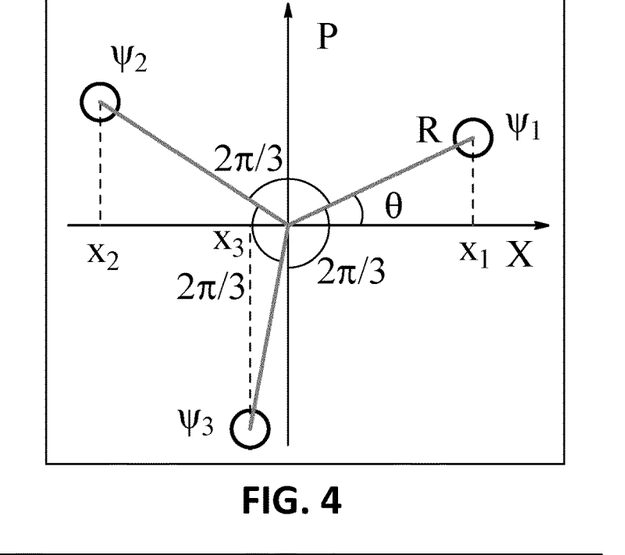
FIG. 4 is a schematic diagram of a phase space of a test pulse.
Figure 7:
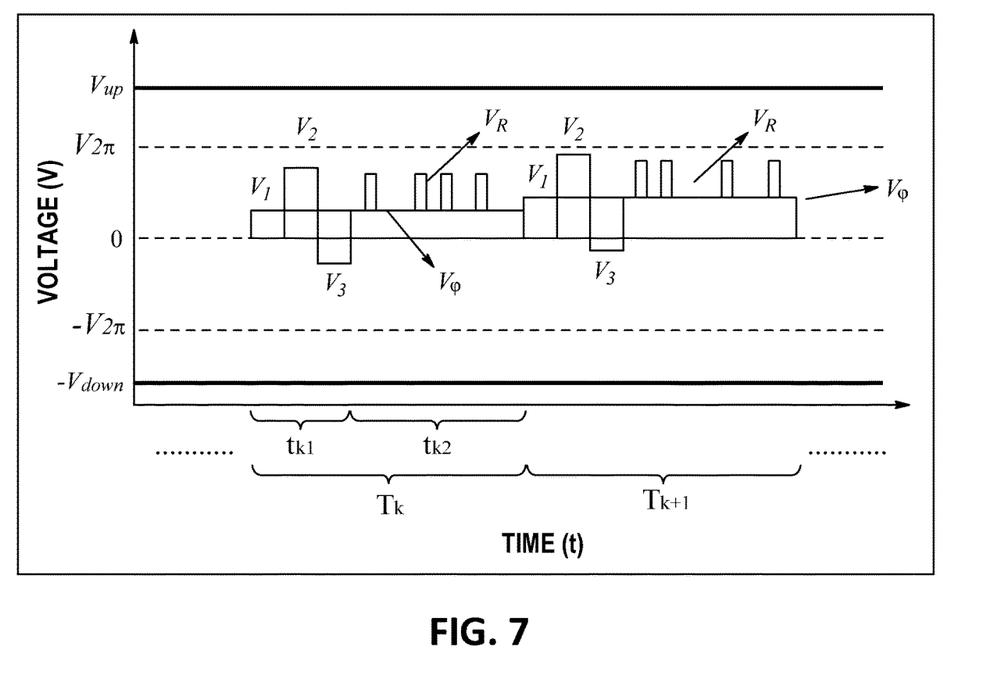
FIG. 7 shows a distribution of a feedback voltage and a test voltage.

Specifically, in a process of signal modulation and phase locking, the first amplitude modulator 3 at the transmit end modulates the signal into three sets of quantum states with the same intensity and phase, and then the phase modulator 11 modulates them into three quantum states shown in FIG. 4. Because the phase modulator 11 also undertakes a task of applying the feedback voltage and locking the relative phase, the two sets of voltages are added beforehand and then output by the second analog voltage generator. As shown in FIG. 7, the feedback voltage $V_\varphi$ in this case may be approximately a direct current voltage in a data packet, and the first modulated voltage loaded onto the test pulse may be approximately an alternate current voltage. $V_1$, $V_2$, and $V_3$ are the first modulated voltages of the three quantum states, that is, the first modulated voltage corresponding to the 0 phase angle corresponds to $V_1$, the first modulated voltage $V_2$ corresponding to the $2\pi/3$ phase angle, and the first modulated voltage $V_3$ corresponding to the $-2\pi/3$ or $4\pi/3$ phase angle. Due to existence of the direct current feedback voltage, measurement of the current phase is not affected, and it is ensured that the relative phase of this measurement is based on the measurement and locking of a previous measurement.

In an actual locking process, the feedback voltage $V_\varphi$ keeps accumulating and ends in exceeding a maximum output range of the second analog voltage generator and losing lock. To ensure long-term continuous running of the system, a threshold needs to be set at a point greater than the voltage of the phase modulator $V_\pi$. When an absolute value of the feedback voltage exceeds the threshold, $2V_\pi$ needs to be added to or subtracted from the feedback voltage to ensure continuous running of the system. Considering the maximum output range of the voltage and frequency of adding or subtracting the voltage, we set a threshold voltage to $\pm 2V_\pi$, and ensure that the absolute value of the maximum output voltage is greater than the $2V_\pi$ voltage (as shown in FIG. 7, $t_{k1}$ denotes test pulse time, $t_{k2}$ denotes data pulse time, $T_k$ denotes transmission time of the $k^{th}$ data packet, and $T_{k+1}$ denotes transmission time of the $(k+1)^{th}$ data packet). In a phase locking process, the value obtained by adding the maximum feedback voltage and the test voltage needs to be less than the maximum output value of the second analog voltage generator. If the former is greater than the latter, the maximum value of the second analog voltage generator needs to be increased; or the jump feature of the first amplitude modulator is used to perform transformation to reduce the former. Available transformation methods include:

Method 1: Decreasing the threshold.

Method 2: Using the first amplitude modulator to modulate $\psi_2$ and $\psi_3$ to $\theta+\pi$. In this case, the phase modulator can modulate the quantum state to the state in FIG. 4 by only loading a voltage $V_2=-\pi/3$ and $V_3=\pi/3$. After this method is applied, the maximum output value of the test voltage decreases by $V_\pi/3$.

In one embodiment of the present invention, the feedback voltage is determined by using a digital PID algorithm, which is specifically:

$$V(k) = K_P(k) + K_I \sum_{i=0}^{k} \theta(i) + K_D(\theta(k) - \theta(k-1)), \qquad (10)$$

where i and k are used to mark a data block, i=0,1, ..., k, $K_p$ denotes a scale factor, $K_I$ denotes an integral coefficient, $K_D$ denotes a differential coefficient, and θ denotes the relative phase, and a voltage calculated by using the $k^{th}$ data block in a process of locking the relative phase needs to be loaded onto the $(k+1)^{th}$ data block.

After the PID algorithm is added into the phase-locked feedback algorithm, steady-state errors can be eliminated, locking precision can be improved, system stability can be improved, and dynamic performance of the system can be improved. In a specific locking process, parameters such as scale, integral and differential may be optimized, and the PID algorithm may be improved. In a steady locking process of the phase, quantum states can be transmitted precisely.

The first modulated voltage is determined according to the following formula:

$$V_1 = V_f + V_{0\pi/3}, V_2 = V_f + V_{2\pi/3}, V_3 = V_f + V_{4\pi/3} \text{ or } V_3 = V_f + V_{-2\pi/3} \quad (11),$$

where $V_f$ denotes the feedback voltage, $V_{0\pi/3}$ denotes a phase voltage when a phase angle is 0, $V_1$ denotes a first modulated voltage corresponding to a 0 value of the phase angle, $V_{2\pi/3}$ denotes a phase voltage when the phase angle is $2\pi/3$, $V_2$ denotes a first modulated voltage corresponding to a $2\pi/3$ value of the phase angle, $V_{-2\pi/3}$ denotes a phase voltage when the phase angle is $-2\pi/3$, $V_{4\pi/3}$ denotes a phase voltage when the phase angle is $4\pi/3$, and $V_3$ denotes a first modulated voltage corresponding to a $-2\pi/3$ or $4\pi/3$ value of the phase angle.

A formula for calculating a measurement base voltage in another dimension is:

$$V_R = \begin{cases} V_f & \text{random number is 0,} \quad \text{not converted by measuring machine} \\ V_f - V_{\pi/2} & \text{random number is 1,} \quad \text{converted by measuring machine} \end{cases} \quad (12)$$

where $V_{\pi/2}$ denotes a phase voltage when the phase angle is $\pi/2$.

Further, the second signal adjustment apparatus 7 includes a single-mode fiber coupler 71, a first detector 72, a high-speed comparator, a delayer 73, a dynamic polarization controller 74, a second polarization-maintaining coupler 75, and a second detector 76.

The quantum transmission channel 6, the single-mode fiber coupler 71, the first detector 72, the high-speed comparator, the delayer 73, and the second data processing apparatus 9 are connected in sequence, to implement clock recovery and synchronization.

The second polarization-maintaining coupler 75 is disposed between the optical fiber splitter 8 and the third signal adjustment apparatus 10, the second polarization-maintaining coupler 75, the second detector 76, and the second data processing apparatus 9 are connected in sequence, and the dynamic polarization controller 74 is connected to the single-mode fiber coupler 71, the second data processing apparatus 9, and the optical fiber splitter 8, to implement automatic control of light field polarization. In this embodiment, the third signal adjustment apparatus 10 is an 80 m polarization-maintaining fiber.

Transmission between the first data processing apparatus 2 and the second data processing apparatus 9 is performed through a classic channel. The classic channel includes a first photoelectric switch 131 connected to the first data processing apparatus 2, a second photoelectric switch 132 connected to the second data processing apparatus 9, and a second single-mode fiber 133 disposed between the first photoelectric switch and the second photoelectric switch. An SFP module is built in both the first photoelectric switch 131 and the second photoelectric switch 132. In this embodiment, two data processing apparatuses are connected between the two photoelectric switches through a 30 km second single-mode fiber 133 to implement key distribution and sharing.

Further, the measurement apparatus 12 includes a 50/50 polarization beam coupler 1201 and a time domain pulse balanced homodyne detector 1202. The 50/50 polarization beam coupler 1201 is connected to the optical fiber splitter 8 and the phase modulator 11 and configured to perform polarization and coupling on the signal light field and the reference light field. The time domain pulse balanced homodyne detector 1202 is connected to the polarization beam coupler 1201 and configured to measure a quadrature component of the signal light field.

Specifically, the reference light field and the signal light field each enter the 50/50 polarization beam coupler 1201 through an input port, and directly enter the time domain pulse balanced homodyne detector 1202 after being coupled and output. By using the 50/50 polarization beam coupler 1201 and the time domain pulse balanced homodyne detector 1202, pulse light measurement is implemented, and a quadrature component of the signal light field is measured. In the experiment, quantum efficiency of the measurement apparatus at the receive end is 60%, and electronic noise is 0.1N0. In a specific measurement process, the second data collection card 901 collects peak values of the pulse signal output by the time domain pulse balanced homodyne detector 1202 and stores a measurement result in the computer for subsequent data processing.

The step of performing data processing on the measured quadrature component in the first data processing apparatus 2 and the second data processing apparatus 9 specifically includes: performing parameter analysis, data reconciliation and privacy amplification on the measured quadrature component.

In a specific data processing process, a measurement base does not need to be disclosed, and only parameter analysis needs to be performed on disclosed data (for example, analysis on extra noise and channel efficiency), and a current security key rate needs to be calculated by using formula (17).

$$\Delta I = \beta \cdot I_{AB} - \chi_{BE} \quad (17)$$

Then data reconciliation and privacy amplification are performed on undisclosed data, and finally a set of same keys is obtained.

Figure 9:
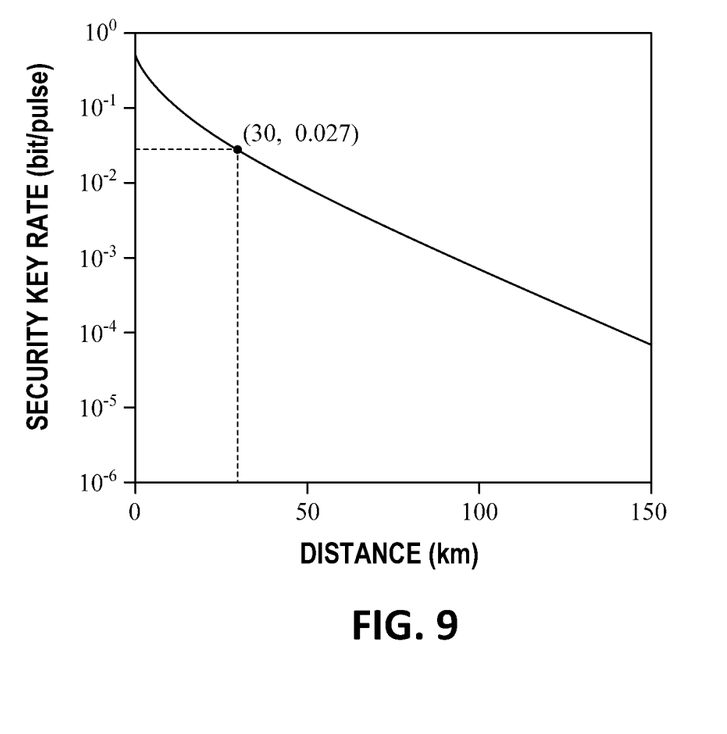
FIG. 9 is a line graph showing that a security key rate varies with a communication distance.

In an experiment process, data reconciliation efficiency is 95.2%, a communication length is 30 km, extra noise may be controlled within 1%, modulation variance is 2.8, detection efficiency of the measurement apparatus at the receive end is 60%, and an electronic noise 0.03. From FIG. 9, the security key rate of the present invention is 0.027 bit/pulse. In the experiment, a pulse repetition rate is 500 kHz, an undisclosed data percentage is 40%, and therefore, the security key generation rate of the system is 5.4 kbps.

Compared with conventional designs, the method for implementing one-dimensional modulation continuous-variable quantum key distribution according to the present invention has the following advantages:

The present invention tactfully uses the phase jump characteristic of the first amplitude modulator and can modulate the quantum states for two phases θ+0 and θ+π by using a single amplitude modulator. Further, one-dimensional quadrature amplitude component or quadrature phase component modulation is performed in the phase space for the light field quantum state.

The present invention uses the first amplitude modulator and the phase modulator to implement locking of the relative phase. Specifically, the second modulated voltage is added to the feedback voltage. The feedback voltage is approximately a direct current voltage and is always loaded onto both ends of the phase modulator. The second modulated voltage is an alternate current voltage and is loaded in the test pulse time segment rather than the data pulse time segment. A voltage obtained by adding the feedback voltage and the second modulated voltage is loaded on both ends of the phase modulator, so that the system can implement modulation of the test pulse, accurately measure the current relative phase, and ensure stable transmission of data with the phase being locked.

In the present invention, the feedback voltage is determined by using a PID algorithm, which makes up for disadvantages of the compensation method. Steady-state errors of the system can be eliminated effectively, and dynamic performance and stability of the system can be improved.

The present invention simplifies the apparatus for implementing continuous-variable quantum key distribution and reduces implementation costs.

Each embodiment of the present specification is described in a progressive manner, each embodiment focuses on the difference from other embodiments, and the same and similar parts between the embodiments may refer to each other.

Several examples are used for illustration of the principles and implementation methods of the present invention. The description of the embodiments is used to help illustrate the method and its core principles of the present invention. In addition, those skilled in the art can make various modifications in terms of specific embodiments and scope of application in accordance with the teachings of the present invention. In conclusion, the contents of this specification shall not be construed as a limitation to the invention.

REFERENCE LIST

1: pulse generation apparatus
2: first data processing apparatus
3: first amplitude modulator
4: first signal adjustment apparatus
5: optical fiber combiner
6: quantum transmission channel
7: second signal adjustment apparatus
8: optical fiber splitter
9: second data processing apparatus
10: third signal adjustment apparatus
11: phase modulator
12: measurement apparatus
71: single-mode fiber coupler
72: first detector
73: high-speed comparator and delayer
74: dynamic polarization controller
75: second polarization-maintaining coupler
76: second detector
99: fiber laser
101: pulse generator
102: first fiber coupler
103: second amplitude modulator
131: first photoelectric switch
132: second photoelectric switch
133: second single-mode fiber
199: first quantum random number generator
201: first data collection card
202: first computer
400: first polarization-maintaining fiber
401: tunable fiber attenuator
900: second quantum random generator
901: second data collection card
902: second computer
1201: 50/50 polarization beam coupler
1202: time domain pulse balanced homodyne detector

What is claimed is:

1. A method for implementing one-dimensional modulation continuous-variable quantum key distribution, comprising:
generating a signal light field and a reference light field at a transmit end by using a pulse generation apparatus;
generating a first modulated voltage by using a first data processing apparatus, and loading the first modulated voltage onto a first amplitude modulator to adjust an amplitude and a phase of the signal light field;
transmitting the signal light field and the reference light field to an optical fiber combiner after the signal light field passes through the first amplitude modulator and a first signal adjustment apparatus, wherein the amplitude and the phase of the signal light field are adjusted when passed through the first amplitude modulator;
combining, by the optical fiber combiner, the signal light field and the reference light field into a quantum signal;
transmitting the quantum signal to a receive end through a quantum transmission channel;
separating the quantum signal into a separated reference light field and a separated signal light field at an optical fiber splitter after the quantum signal passes through a second signal adjustment apparatus in the receive end;
generating a feedback voltage, a second modulated voltage, and a measurement base voltage by using a second data processing apparatus, and loading the feedback voltage and the second modulated voltage onto a phase modulator, so as to lock a relative phase of the separated signal light field and the separated reference light field and detect fluctuation of a quadrature component in another dimension under an effect of the feedback voltage or a joint effect of the second modulated voltage and the feedback voltage; wherein, generating the feedback voltage and the second modulated voltage by using the second data processing apparatus and loading the feedback voltage and the second modulated voltage onto the phase modulator further comprises: loading the feedback voltage onto the phase modulator throughout an entire time segment measured by a phase value; and loading the second modulated voltage concurrently in a test pulse time segment in the entire time segment;
transmitting the separated reference light field and the separated signal light field to a measurement apparatus after the separated reference light field passes through a third signal adjustment apparatus and the phase modulator, wherein the relative phase of the separated signal light field and the separated reference light field is locked when the separated reference light field is passed through the phase modulator,
measuring a quadrature component of a quantum state of a pulse light field by using the measurement apparatus;
transmitting the measured quadrature component to the second data processing apparatus and the first data processing apparatus; and performing data processing on the measured quadrature component in the first data processing apparatus and the second data processing apparatus separately and obtaining a set of secure quantum keys at the transmit end and the receive end by the data processing.

2. The method of claim 1, wherein generating the first modulated voltage by the first data processing apparatus further comprises:

generating 0 and 1 random codes by using a quantum random generator, and converting the random codes into random numbers that are evenly distributed in (0,1);

generating a Gaussian distribution random number X according to evenly distributed random numbers by using a Box-Muller method, wherein the Gaussian distribution random number X complies with a standard normal distribution N(0, 1), and a corresponding probability density function is:

$$f_X(X) = \frac{1}{\sqrt{2\pi}} e^{-\frac{X^2}{2}}, -\infty < X < +\infty,$$

wherein the following condition is met:

$$\int_{-\infty}^{+\infty} \frac{1}{\sqrt{2\pi}} e^{-\frac{X^2}{2}} dX = 1;$$

performing truncation at ±3σ, and converting the previous formula into:

$$\int_{-3}^{+3} \frac{1}{\sqrt{2\pi}\sigma} e^{-\frac{X^2}{2\sigma^2}} dX = 99.74\%, \sigma = 1;$$

with an interval of an amplitude transmittance r of the first amplitude modulator being [−1,1], substituting Z=X/3 for X, so that Z corresponds to r in a one-to-one mapping manner, and then converting the previous formula into:

$$\int_{-1}^{+1} \frac{1}{\sqrt{2\pi}\sigma} e^{-\frac{Y^2}{2\sigma^2}} dZ = 99.74\%, \sigma = 1/3,$$

wherein Z denotes an intermediate variable; when the relative phase of the reference light field and the signal light field is 0, $$Z = r$$
$$= E_{out}/R$$
$$= \cos(\alpha V + \Delta)$$
$$= \cos\left(\frac{\pi}{2V_\pi} V + \Delta\right)$$
$$= \cos\left(\frac{\pi}{2V_\pi} (V + V_{max})\right);$$

determining, according to the previous formula, that the first modulated voltage loaded on the first amplitude modulator is V:

$$V = \frac{2V_\pi}{\pi} \arccos Z - V_{max},$$

wherein $V_{max}$ denotes a maximum transmittance voltage.

3. The method of claim 1, wherein the pulse generation apparatus comprises a fiber laser, a pulse generator, two second amplitude modulators, and a first fiber coupler, and wherein:

the two second amplitude modulators are cascaded between the fiber laser and a first polarization-maintaining fiber coupler, are both connected to the pulse generator, and are used to adjust, as driven by a pulse signal emitted by the pulse generator, an amplitude of each laser signal emitted by the fiber laser; and the first fiber coupler is used to perform beam splitting on the amplitude-adjusted laser signal to obtain the signal light field and the reference light field.

4. The method of claim 1, wherein the first signal adjustment apparatus comprises a first polarization-maintaining fiber and a variable optical attenuator, and the first amplitude modulator, the first polarization-maintaining fiber, the variable optical attenuator, and the optical fiber combiner are connected in sequence.

5. The method of claim 1, wherein the quantum transmission channel comprises a first single-mode fiber or a transmission medium formed by a free space.

6. The method of claim 1, wherein the feedback voltage $V_f(k)$ is determined according to the following formula:

$$V_f(k) = K_P \theta(k) + K_I \sum_{i=0}^{k} \theta(i) + K_D(\theta(k) - \theta(k-1)),$$

wherein i and k are used to mark a data block, $K_p$ denotes a scale factor, $K_I$ denotes an integral coefficient, $K_D$ denotes a differential coefficient, and θ denotes the relative phase, and a voltage calculated by using the $k^{th}$ data block in a process of locking the relative phase needs to be loaded onto the $(k+1)^{th}$ data block;

the first modulated voltage is determined according to the following formula:

$$V_1 = V_f + V_{0\pi/3}, V_2 = V_f + V_{2\pi/3}, V_3 = V_f + V_{4\pi/3} \text{ or } V_3 = V_f + V_{-2\pi/3},$$

wherein $V_f$ denotes the feedback voltage, $V_{0\pi/3}$ denotes a phase voltage when a phase angle is 0, $V_f$ denotes a first modulated voltage corresponding to a 0 value of the phase angle, $V_{2\pi/3}$ denotes a phase voltage when the phase angle is $2\pi/3$, $V_2$ denotes a first modulated voltage corresponding to a $2\pi/3$ value of the phase angle, $V_{-2\pi/3}$ denotes a phase voltage when the phase angle is $-2\pi/3$, $V_{4\pi/3}$ denotes a phase voltage when the phase angle is $4\pi/3$, and $V_3$ denotes a first modulated voltage corresponding to a $-2\pi/3$ or $4\pi/3$ value of the phase angle;

a formula for calculating a measurement base voltage $V_R$ in another dimension is:

$$V_R = \begin{cases} V_f & \text{random number is 0, not converted by measuring machine} \\ V_f - V_{\pi/2} & \text{random number is 1, converted by measuring machine} \end{cases},$$

wherein $V_{\pi/2}$ denotes a phase voltage when the phase angle is $\pi/2$.

7. The method of claim 1, wherein the second signal adjustment apparatus comprises a single-mode fiber coupler, a first detector, a high-speed comparator, a delayer, a dynamic polarization controller, a second polarization-maintaining coupler, and a second detector, and wherein:

the quantum transmission channel, the single-mode fiber coupler, the first detector, the high-speed comparator, the delayer, and the second data processing apparatus are connected in sequence, to implement clock recovery and synchronization; and the second polarization-maintaining coupler is disposed between the optical fiber splitter and the third signal adjustment apparatus, the second polarization-maintaining coupler, the second detector, and the second data processing apparatus are connected in sequence, and the dynamic polarization controller is connected to the single-mode fiber coupler, the second data processing apparatus, and the optical fiber splitter, to implement automatic control of light field polarization.

8. The method of claim 1, wherein the measurement apparatus comprises:

a 50/50 polarization beam coupler, connected to the optical fiber splitter and the phase modulator, and configured to perform polarization and coupling on the signal light field and the reference light field; and a time domain pulse balanced homodyne detector, connected to the polarization beam coupler, and configured to measure a quadrature component of the signal light field.

9. The method of claim 1, wherein the performing data processing on the measured quadrature component in the first data processing apparatus and the second data processing apparatus specifically comprises: performing parameter analysis, data reconciliation and privacy amplification on the measured quadrature component.

* * * * *